United States Patent Office 3,487,131
Patented Dec. 30, 1969

3,487,131
PROCESS FOR MAKING TETRATHIOPHOSPHATES
Calvin J. Worrel, Detroit, Mich., assignor to Ethyl Corporation, New York, N.Y., a corporation of Virginia
No Drawing. Filed Feb. 27, 1967, Ser. No. 619,001
Int. Cl. C07f 9/16; C10m 1/48, 3/42
U.S. Cl. 260—981                         5 Claims

ABSTRACT OF THE DISCLOSURE

Reaction of a monoolefin, especially a bicyclic terpene such as alpha-pinene, with hydrogen sulfide and a phosphorus sulfide such as phosphorus pentasulfide yields a tetrathiophosphate ester. These compounds are useful as lubricant additives.

BACKGROUND

Tetrathiophosphate esters are useful in many applications such as antiwear and anticorrosion agents in lubricating oils, antioxidants and synergists for antioxidants, and as insecticides. Heretofore these compounds have been available only in limited amounts because of the difficulty encountered in their preparation. For example, in U.S. 3,073,857, a method is disclosed for making them by the reaction of a secondary alcohol with phosphorus pentasulfide. The reaction first produced a phosphorodithioate ester which formed a tetrathiophosphate ester after standing 37 months. The present invention provides good yields of tetrathiophosphates from inexpensive starting materials by a short, simple process.

SUMMARY

An object of this invention is to provide a facile process for manufacturing tetrathiophosphates. A further object is to provide a process for making a bornyl tetrathiophosphate from readily available bicyclic terpenes.

These and other objects are accomplished by providing a process for making a tetrathiophosphate ester comprising reacting from about 50–150 mole parts of a monoolefin with from about 25–100 mole parts of hydrogen sulfide and from about 2.5–15 mole parts of phosphorus pentasulfide at a temperature of from about 50–250° C.

Olefins used include both straight and branched monoolefins and also a wide variety of cyclic monoolefins. Preferably, the olefins contain from 2 to about 20 carbon atoms, although higher molecular weight olefins can be used. Examples of the olefins include ethylene, propylene, n-butene, isobutene, n-pentene, isopentene, 2-methyl-butene-2, n-decene-1, n-decene-2, n-dodecene-1, n-dodecene-2, n-eicosene-1, diisobutylene, cyclopentene, cyclohexene, cyclooctene, and the like.

An especially useful class of olefins are the bicyclic terpenes. Of these reactants, bornylene, α-pinene, β-pinene, and camphene are unusual in that no matter which member of the class is selected as the starting olefin the final product is a bornyl tetrathiophosphate. This occurs despite the fact that each has a different structure. The bicyclic terpenes are a class of chemical compounds containing a fused ring system, one double bond, and have the empirical formula $C_{10}H_{16}$. Included among the terpene hydrocarbons to which this invention is applicable are α-pinene, β-pinene, camphene, α-fenchene, β-fenchene, fenchylene, bornylene, sabinene, carene and mixtures of such materials. Most of these terpenes are readily available in naval stores. Thus, the present process provides a method of making tetrathiophosphates from readily available cheap starting materials. Furthermore, the process has the unique property that a mixture of bornylene, α-pinene, β-pinene and camphene can be employed, resulting in a substantially pure bornyl tetrathiophosphate.

The phosphorus sulfides used in the present process are $P_4S_3$, $P_4S_5$, $P_4S_7$, and $P_4S_{10}$ (sometimes referred to as $P_2S_5$). Mixtures of these and also appropriate quantities of elemental phosphorus and elemental sulfur can be used. The preferred phosphorus sulfide is phosphorus pentasulfide having the empirical formula $P_4S_{10}$.

The reaction is believed to proceed by the following equation.

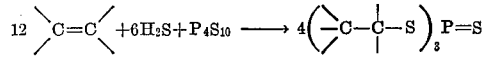

A wide range of reactant ratios can be employed. A useful range is represented by the reaction of from about 50–150 mole parts of the monoolefin with from about 25–100 mole parts of hydrogen sulfide and from about 2.5–15 mole parts of phosphorus pentasulfide ($P_4S_{10}$). A more useful reactant range is from about 75–125 mole parts of monoolefin per about 30–80 mole parts of hydrogen sulfide and about 5–10 mole parts of pentasulfide. The most preferred reactant ratio is from about 90–110 mole parts of monoolefin per about each 45–60 mole parts of hydrogen sulfide and about 6.5–9 mole parts of phosphorus pentasulfide.

The reaction can be conducted at temperatures from about 50–250° C. A more preferred temperature range is from about 80–150° C., and a most preferred temperature range is from about 110–140° C.

Although the reaction can be conducted in the presence of a solvent, this is not necessary nor recommended since the reaction proceeds nicely without a solvent. When a solvent is used it should be relatively inert to the reactants under the reaction conditions. Suitable solvents are the hydrocarbons including both paraffinic and aromatic hydrocarbons. Some examples of these are hexane, octane, benzene, toluene, xylene, and the like.

Due to the nature of the reactants, the reaction is preferably carried out under pressure. A useful pressure range is from about 100–500 p.s.i.g., and under the most preferred reaction conditions a pressure range of about 300–400 p.s.i.g. will be encountered.

The following examples serve to illustrate the process of this invention. All parts are parts by weight unless otherwise indicated.

Example 1

To a pressure reaction vessel equipped with stirrer, thermocouple, pressure gauge, heating means and hydrogen sulfide delivery means was added 55.5 parts of phosphorus pentasulfide and 272 parts of α-pinene. The pressure vessel was sealed and 68 parts of hydrogen sulfide was added while stirring, causing the pressure to rise to 185 p.s.i.g. at 33° C. Heat was applied, and after 30 minutes, the temperature reached 72.5° C. and the pressure was 295 p.s.i.g. Heating was continued, but the pressure dropped. After 55 minutes, the temperature was 140° C. and the pressure was 275 p.s.i.g. The temperature was maintained between 112–140° C. for a total reaction time of 220 minutes, at which time it was cooled to 39° C. and vented. The vessel was discharged and the contents filtered to give 203.1 parts of a solid product. The filtrate was heated to 50° C. under high vacuum to remove volatiles and an additional 57.5 parts of solids precipitated on cooling. After recrystallization from dioxane the solids had a melting point of 237.5–239.5° C. Elemental analysis was: Carbon 61.8 percent; hydrogen, 9.8 percent, phosphorus, 5.5 percent; and sulfur, 22.7 percent. Molecular weight determination of 564 and infrared studies served to confirm the product identity as tribornyl tetrathiophosphate.

Example 2

Further reactions using α-pinene were carried out following the general procedure of Example 1. The following table shows the reaction conditions and results.

| Reactant mole ratio, α-Pinene:$H_2S$:$P_4S_{10}$ | Temp. (° C.) | Pressure (p.s.i.g.) | Time (min.) | Yield* (percent) |
|---|---|---|---|---|
| 3:3:0.185 | 224 | 170-450 | 320 | 98.5 |
| 2:2:0.125 | 141.5 | 145-290 | 220 | 94.0 |
| 3:2:0.165 | 127 | 135-245 | 300 | 95.0 |

*Of tribornyl tetrathiophosphate based on $P_4S_{20}$.

Example 3

The procedure of Example 1 is repeated employing β-pinene instead of α-pinene. The product is tribornyl tetrathiophosphate.

Example 4

The process of Example 1 is repeated employing α-fenchene instead of α-pinene. The product is trifenchyl tetrathiophosphate.

Example 5

The process of Example 1 is repeated employing cyclohexene instead of α-pinene. The product is tricyclohexyl tetrathiophosphate.

The above example, when repeated using other cycloalkenes, such as cyclopentene, cycloheptene, and cyclooctene, yields the corresponding tricycloalkyl tetrathiophosphate.

Example 6

In the reaction vessel of Example 1 is placed 1000 parts of turpentine and 222 parts of phosphorus pentasulfide. The vessel is sealed and, while stirring, 150 parts of hydrogen sulfide are introduced. The reaction mixture is heated to 70° C. and stirred for one more hour. It is then cooled to 100° C. and vented. It is discharged slowly into 2000 parts of dioxane and the product recrystallized. The product is tribornyl tetrathiophosphate.

Example 7

In the reaction vessel of Example 1 is placed 222 parts of phosphorus pentasulfide and 500 parts of xylene. The vessel is sealed and 400 parts of butene-1 and 140 parts of hydrogen sulfide added. The vessel is heated to 70° C., while stirring, and held there one hour. It is then heated to 130° C. and stirred at that temperature for three more hours. It is cooled to 50° C. and vented. The contents are discharged, filtered, and the xylene removed from the filtrate by vacuum distillation, leaving tributyl tetrathiophosphate.

Example 8

The process of Example 1 is followed using n-dodecene-1, a readily available α-olefin. The product is tridodecyl tetrathiophosphate.

As mentioned previously, the products made by the present process are used in a wide range of applications. Tests were conducted to demonstrate their antiwear effect in lubricating oil. These tests utilized the "Extreme Pressure Lubricant Tester" (EP tester) described by Boerlage in "Engineering," vol. 136, p. 46, July 14, 1933. The EP tester uses four balls of equal size, arranged in a tetrahedral formation. The bottom three balls are held in a non-rotatable fixture which is essentially a universal chuck that holds the balls in abutting relation to each other. Since the bottom three balls are of equal size, their centers form the apices of an equilateral triangle. The top ball is affixed to a rotatable spindle whose axis is positioned perpendicularly to the plane of the non-rotatable fixture and in line with the center point of the triangle whose apices are the centers of the three bottom balls.

In operation, the four balls are immersed in the lubricant composition to be tested and the fixture holding the three bottom balls is moved upwardly so as to bring the three fixed balls into engagement with the upper rolling ball. To increase the load, the fixture is moved upwardly and axially of the rotating spindle affixed to the upper ball.

The lubricating effectiveness of the lubricant is determined by the amount of wear occurring on the lower balls at their points of contact with the upper rotating ball. If the lubricant proves completely effective, the amount of wear will be negligible. If the lubricant is not completely effective, the upper ball may weld or seize to the lower balls. Such failure is due to the heat of friction generated at the contact points between the balls. Intermediate degrees of wear are manifested by the occurrence of wear scars on the lower balls. Measurement of this wear scar gives a quantitative basis for comparing the effectiveness of a lubricant in the test.

In the first test the four balls, made of SAE 52–100 steel, were immersed in a neutral hydrocarbon lubricating oil (additive free). The top ball was rotated at 1800 r.p.m. and the force of the lower three balls against the top rotating ball measured in kg. was varied. In each case the scar was measured after one minute of operation. The above base oil exhibited a 0.3 mm. scar at 30 kg.; 0.35 mm. at 40 kg.; 2.2 mm. at 45 kg.; and weld occurred at 90 kg. In a second test employing the same oil, but containing one percent of tribornyl tetrathiophosphate, the following results were obtained: 0.33 mm. at 40 kg.; 1.4 mm. at 50 kg.; 1.5 mm. at 60 kg.; 1.7 mm. at 80 kg.; 1.9 mm. at 100 kg.; 20 mm. at 120 kg. and weld occurred at 140 kg. Hence, the additive made by the present process substantially decreased the wear scar and raised the weld load from 90 to 140 kg.

Lubricant compositions containing the present additives can be made from a wide variety of lubricants including both synthetic and petroleum-derived lubricating oils. The following examples illustrate the preparation of some typical petroleum-derived lubricants.

Example 9

Five parts of tribornyl tetrathiophosphate were blended with 95 parts of a paraffinic, mineral white oil having a sulfur content of 0.07 percent, a viscosity of 17.15 centistokes at 100° F., and viscosity index of 107.5. The resulting oil had improved wear inhibiting properties.

Example 10

To 1000 parts of a solvent-refined, mid-continent, neutral lubricating oil containing 0.05 percent zinc, as zinc dilauryldithiophosphate, 4 percent of a polymethacrylate VI improver, 0.05 percent of an overbased calcium sulfonate and 2.5 percent of a dispersant prepared by the reaction of an alkenyl succinic anhydride, wherein the alkenyl radical is a polybutene with a molecular weight of 1000, with tetraethylenepentamine, is added 0.5 percent of tridodecyl tetrathiophosphate.

I claim:

1. A process for making a tetrathiophosphate ester comprising reacting from 50–150 mole parts of a monoolefin with from 25–100 mole parts of hydrogen sulfide and from 2.5–15 mole parts of phosphorus pentasulfide at a temperature of from about 50–250° C. and at a pressure of from 100–500 p.s.i.g.

2. The process of claim 1 wherein said monoolefin is a bicyclic terpene.

3. The process of claim 2 wherein from about 90 to 110 mole parts of said bicyclic terpene are reacted with from about 45–60 mole parts of said hydrogen sulfide and from about 6.5–9 mole parts of said phosphorus pentasulfide.

4. The process of claim 2 wherein said bicyclic terpene is alpha-pinene.

5. The process of claim 4 wherein said temperature is from about 80–150° C.

(References on following page)

References Cited

UNITED STATES PATENTS 2,379,312   6/1945   May   260—981 XR
2,769,831   11/1956   Scott   260—981 XR CHARLES B. PARKER, Primary Examiner A. H. SUTTO, Assistant Examiner U.S. Cl. X.R.

252—46.6; 260—958, 963, 999

PO-1050
(5/69)

UNITED STATES PATENT OFFICE
CERTIFICATE OF CORRECTION

Patent No. 3,487,131                    Dated December 30, 1969

Inventor(s)   Calvin J. Worrel

It is certified that error appears in the above-identified patent and that said Letters Patent are hereby corrected as shown below:

Column 3, line 11, "$P_4S_{20}$" should read -- $P_4S_{10}$ --.
Column 4, line 29, "20 mm." should read -- 2.0 mm. --

SIGNED AND
SEALED
JUN 9 1970

(SEAL)
Attest:

Edward M. Fletcher, Jr.
Attesting Officer

WILLIAM E. SCHUYLER, JR.
Commissioner of Patents